United States Patent
Sainct et al.

(10) Patent No.: US 8,783,621 B2
(45) Date of Patent: Jul. 22, 2014

(54) METHOD AND SYSTEM FOR CONTROLLING A SET OF AT LEAST TWO SATELLITES, DESIGNED TO PROVIDE A SERVICE ON A GEOSTATIONARY ORBIT, RENDERING SAID SERVICE ON A NON-GEOSTATIONARY ORBIT

(71) Applicant: Thales, Neuilly-sur-Seine (FR)

(72) Inventors: Hervé Sainct, Le Cannet (FR); Joël Amalric, Auribeau-sur-Siagne (FR)

(73) Assignee: Thales, Neuilly sur Seine (FR)

( * ) Notice: Subject to any disclaimer, the term of this patent is extended or adjusted under 35 U.S.C. 154(b) by 120 days.

(21) Appl. No.: 13/707,464

(22) Filed: Dec. 6, 2012

(65) Prior Publication Data

US 2013/0146714 A1 Jun. 13, 2013

(30) Foreign Application Priority Data

Dec. 9, 2011 (FR) ..................................... 11 03778

(51) Int. Cl.
*F02K 1/00* (2006.01)
*B64G 1/10* (2006.01)
*B64G 1/24* (2006.01)
*B64G 1/50* (2006.01)

(52) U.S. Cl.
CPC ............... *B64G 1/24* (2013.01); *B64G 1/1085* (2013.01); *B64G 1/503* (2013.01); *B64G 1/242* (2013.01); *B64G 1/1021* (2013.01)
USPC ........................................ 244/164; 244/158.1

(58) Field of Classification Search
USPC ............. 244/158.6, 158.5, 158.8, 158.4, 169, 244/164; 701/3, 4, 531, 13, 226; 455/427, 455/12.1
See application file for complete search history.

(56) References Cited

U.S. PATENT DOCUMENTS

| | | | |
|---|---|---|---|
| 4,997,146 A * | 3/1991 | Weyandt, Jr. | 244/164 |
| 5,108,050 A * | 4/1992 | Maute | 244/171 |
| 6,073,887 A * | 6/2000 | Hosick | 244/171.8 |
| 6,082,677 A | 7/2000 | Kikuchi | |
| 6,442,385 B1 * | 8/2002 | Marko | 455/427 |
| 6,675,011 B1 * | 1/2004 | Kita | 455/422.1 |
| 8,205,839 B2 * | 6/2012 | Anzel et al. | 244/164 |
| 8,360,367 B2 * | 1/2013 | Korb et al. | 244/158.4 |
| 2002/0132577 A1 * | 9/2002 | Draim | 455/12.1 |
| 2002/0151273 A1 * | 10/2002 | Marko | 455/12.1 |
| 2003/0025041 A1 * | 2/2003 | Higgins | 244/158 R |
| 2003/0034422 A1 * | 2/2003 | Higgins | 244/158 R |
| 2007/0032191 A1 * | 2/2007 | Marko | 455/12.1 |
| 2008/0011904 A1 * | 1/2008 | Cepollina et al. | 244/172.6 |

(Continued)

FOREIGN PATENT DOCUMENTS

| EP | 0017597 A1 | 10/1980 |
|---|---|---|
| WO | 01/33720 A2 | 5/2001 |

*Primary Examiner* — Christopher P Ellis
*Assistant Examiner* — Medhat Badawi
(74) *Attorney, Agent, or Firm* — Baker Hostetler LLP

(57) ABSTRACT

A method is provided for controlling a set of at least two satellites, designed to provide a service on a geostationary orbit, rendering said service on a non-geostationary orbit, in which means involved in the performance of said service, installed on board a satellite, are deactivated when the sun can damage it, and means involved in the performance of said service installed on board another satellite of the set are activated, when this is necessary to the continuity of the service.

7 Claims, 1 Drawing Sheet

(56) References Cited

U.S. PATENT DOCUMENTS

| | | |
|---|---|---|
| 2008/0128559 A1 | 6/2008 | Ho et al. |
| 2008/0154502 A1* | 6/2008 | Tekawy et al. ................ 701/226 |
| 2008/0268837 A1* | 10/2008 | Marko .......................... 455/428 |
| 2010/0179711 A1* | 7/2010 | Munir et al. .................... 701/13 |
| 2012/0022726 A1* | 1/2012 | Chilan ............................ 701/13 |
| 2013/0018529 A1* | 1/2013 | Ploschnitznig ................... 701/2 |
| 2013/0032673 A1* | 2/2013 | Kobayashi ................. 244/158.4 |

* cited by examiner ents described as nonlimiting examples and illustrated by the appended drawings in which:

METHOD AND SYSTEM FOR CONTROLLING A SET OF AT LEAST TWO SATELLITES, DESIGNED TO PROVIDE A SERVICE ON A GEOSTATIONARY ORBIT, RENDERING SAID SERVICE ON A NON-GEOSTATIONARY ORBIT

CROSS-REFERENCE TO RELATED APPLICATION

This application claims priority to foreign French patent application No. FR 1103778, filed on Dec. 9, 2011, the disclosure of which is incorporated by reference in its entirety.

FIELD OF THE INVENTION

The present invention relates to a method for controlling a set of at least two satellites, designed to provide a service on a geostationary orbit, rendering said service on a non-geostationary orbit.

BACKGROUND

The operational availability of a service rendered by a space system comprising a plurality of satellites is a strict and costly criterion.

Satellites designed to be used on geostationary orbits are well known, notably comprising so-called cold faces provided with heat exchangers making it possible to limit the heating of the satellite. However, these geostationary satellites are not suitable for rendering a service requiring a non-geostationary orbit.

SUMMARY OF THE INVENTION

One aim of the invention is to overcome the above problems.

There is also proposed, according to one aspect of the invention, a method for controlling a set of at least two satellites, designed to provide a service on a geostationary orbit, rendering said service on a non-geostationary orbit, in which means involved in the performance of said service installed on board a satellite are deactivated when the sun can damage it, and means involved in the performance of said service installed on board another satellite of the set are activated, when this is necessary to the continuity of the service.

Thus, by virtue of the invention, it is possible to use geostationary satellites of known design, on non-geostationary orbits, and thus save on the very significant development costs.

According to one embodiment, the attitude of a satellite is controlled by taking account of the instantaneous position of the sun, so that the attitude of the satellite is temporarily modified when the sun can damage it.

Thus, the satellite is not damaged by the sun, and its payload(s) can be used for a longer time.

In one embodiment, said attitude control comprises continuous yaw angle piloting, or "yaw steering", so that the attitude of the satellite is modified continuously when the sun can damage it, then when the sun no longer risks damaging the satellite, the attitude control is once again modified so that the pointing of the satellite reverts back to the normal pointing to a target geographic area over which said service has to be rendered.

Such temporary changes of the attitude control mode thus allow for a longer use of the functions of the satellite in its orbit, for example, a payload of the satellite will thus operate over a greater portion of the orbit, increasing the operational availability.

According to one embodiment, said service rendered by the set of satellites being the imaging of a geographic area of the Earth, the means involved in the performance of said service installed on board a satellite are activated with a temporal offset between said satellites, in relation to the shot-taking duration of a satellite.

Thus, the taking of a shot starts on one satellite, then the taking of a shot of the same region starts on the next satellite when the preceding satellite has saved a portion of the image, so as to obtain more frequent images.

In one embodiment, the set comprising two satellites, the shot-taking of a geographic area by a satellite starts when the other satellite has performed half the shot-taking of said geographic area.

Thus, images are obtained with twice the frequency.

According to one embodiment, when the sun does not risk damaging said satellites, said satellites are controlled in such a way that, at each instant, the service rendered for a geographic area is rendered by just one of said satellites.

Thus, it is possible to use orbits of lower inclination, therefore that are easier to reach by a launch vehicle, also making it possible to save on satellite launch costs.

According to another aspect of the invention, there is also proposed a system for controlling a set of at least two satellites designed to provide a service on a geostationary orbit, rendering said service on a non-geostationary orbit, characterized in that it comprises control means suitable for deactivating means involved in the performance of said service, installed on board a satellite, when the sun can damage it, and for activating means involved in the performance of said service installed on board another satellite of the set when this is necessary to the continuity of the service.

BRIEF DESCRIPTION OF THE DRAWINGS

The invention will be better understood on studying a few embodiments described as nonlimiting examples and illustrated by the appended drawings in which.

In the different figures, the elements that have identical references are similar.

DETAILED DESCRIPTION

Figure 1:
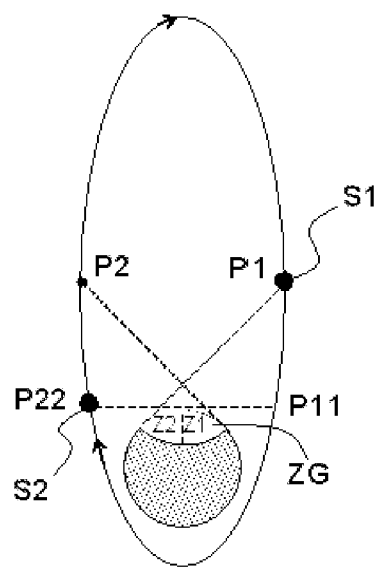
FIG. 1 schematically illustrates a control system and method according to the prior art.

FIG. 1 illustrates a conventional method for controlling a set of at least two satellites, in this case two satellites S1 and S2, designed to provide a service on a non-geostationary orbit.

The control of the set of satellites is conventionally managed symmetrically, as illustrated in FIG. 1, without taking account of the solar constraint, because the satellites are designed to operate on the planned orbit.

In the example represented, a first satellite S1 can be relayed by a second satellite S2, both belonging to the set of satellites, when they are respectively in the positions P1 and P2 of the orbit, for which the geographic area ZG, for which the service has to be rendered, is simultaneously covered by the first satellite S1 and the second satellite S2.

As a variant, it is also possible to divide the area ZG into two, for example Z1 and Z2, the boundary of which can be variable, and corresponding to the visibility horizon reached by one of the satellites, and to perform a progressive transition during which, for example, the first satellite S1 in position P11 covers the sub-area Z1 while the second satellite S2 in position P22 covers the sub-area Z2, which allows the satellites to operate over a longer portion of the orbit.

There may be satellite instruments or payloads available that have been developed for a given orbit, that it would be desirable to reuse on a different orbit. This is particularly common for satellites initially designed for a geostationary orbit, because there are many satellites and services on this orbit.

When there is a desire to use satellites, designed to be used on a geostationary orbit, on a non-geostationary orbit, for example on an inclined orbit with great eccentricity, various constraints apply and render the payloads of the satellites inoperative at certain moments and/or over certain portions of the orbit. One of these significant constraints is the relative position of the sun in relation to the payloads of the satellites.

The present invention makes it possible to reuse, without adaptation, or with very minor adaptations, payloads, for example observation payloads, initially designed for the geostationary orbit, so they can be used on a non-geostationary orbit, for example an inclined orbit with great eccentricity.

Unlike the geostationary orbit, the other orbits, for example the inclined orbits with great eccentricity, are notably characterized by very different sunlight exposure conditions. For the geostationary orbit, the sun moves around the satellites while remaining close to one and the same plane, whereas on a non-geostationary orbit, such as an inclined orbit with great eccentricity, its apparent movement, although slow, makes it successively illuminate most of the faces of the satellites, which is generally incompatible with the radiators for cooling a payload designed for the geostationary orbit, which radiators must never be exposed to the sun.

Figure 2:
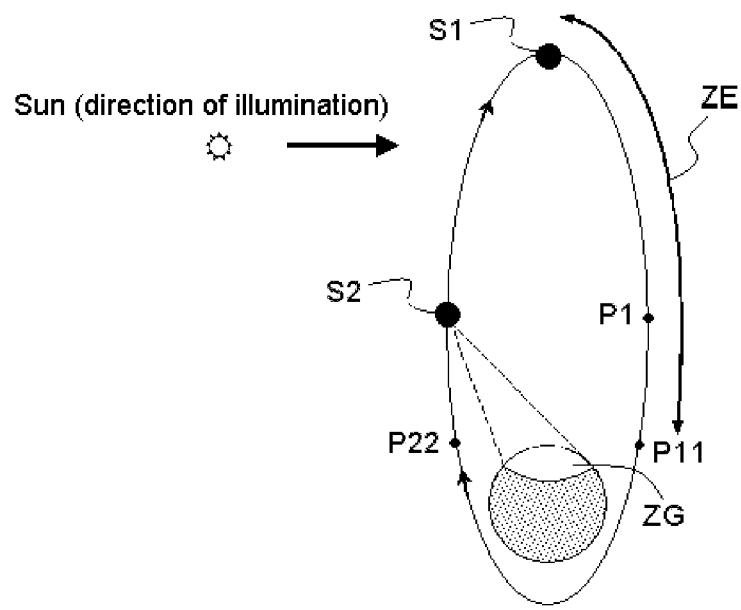
FIG. 2 schematically illustrates a control system and method according to one aspect of the invention.

The present invention makes it possible to reuse satellites designed for geostationary orbits on non-geostationary orbits, for example in the case of a fleet or constellation of satellites, using, as a service example, a handover of an imaging function, the specific feature of which is that it is non-symmetrical, as illustrated in the example of FIG. 2.

Handovers of a service are known, such as an imaging activity from one satellite to the next of a set of satellites which are generally symmetrical because they are defined only as a function of the relative geometry of observation, the successive satellites serving the same function in this field. However, in non-geostationary orbit, for example in inclined eccentric orbit, the position of the sun, which is variable, breaks the symmetry, and will therefore, at certain moments, prevent the operation of the payload on one of the satellites but not on the next, because it is not in the same orbital position.

The method then consists in deciding the moment of the handover of this observation function at the instant when the solar illumination is on the point of interrupting the operation of the payload of the active satellite rendering the service.

The active satellite can, optionally, then perform a change of attitude to avoid having the elements of the satellite, for example payloads, which can be damaged by the sun, such as the heat exchangers, being exposed to the sun.

When one of the following conditions is met, the attitude control of the satellites abandons the continuous yaw angle piloting, or "yaw steering", and reverts to the preceding control mode. This abandonment takes place when the attitude resulting from the yaw steering becomes incompatible with the operation of an element of the satellite (for example for a formed beam radio antenna for which the field would not be symmetrical, the yaw angle piloting progressively induces a rotation of the coverage on the ground which ultimately will no longer have the correct shape; or even for an observation payload for which the scanning or the post-processing could no longer compensate for an excessive rotation of the target due to the yaw angle piloting). This abandonment also takes place when the satellite concerned leaves the orbit portion where the target area is visible.

This principle of temporary change of piloting of a satellite, at the moment when the solar illumination appears, and for which the shutdown criteria have previously been described, is a novel method, a departure from the usual considerations associated with observation geometry. It makes it possible to reuse a payload of a satellite to render a service, for example an observation service initially designed for a geostationary orbit, without modification and therefore inexpensively, for a non-geostationary orbit, such as an orbit with great eccentricity.

The associated laws of orbital mechanics are here all deterministic, in other words, the scheduling of the service handover from one satellite to another does not have to be decided in real time, it can perfectly well be calculated and scheduled in advance.

Optionally, minor modifications, such as the adaptation of solar baffles around the heat exchangers allow the payload to be operated for longer at the beginning of a low sun, therefore improve the performance if necessary.

FIG. 2 illustrates an exemplary control method according to one aspect of the invention, for a set of at least two satellites, in this case two satellites S1 and S2, designed to provide a service on the geostationary orbit, used on a non-geostationary orbit.

The area ZE of the orbit of the satellites S1, S2 corresponds to the portion of the orbit over which the solar illumination can damage satellite equipment.

The handover of service from the first satellite S1 to the second satellite S2 is ordered just before the satellite S1 passes into the area ZE of the orbit over which the solar illumination can damage satellite equipment. The attitude of the first satellite S1 is then controlled, continuously by taking account of the instantaneous position of the sun, so that the attitude of the satellite is temporarily modified when the sun can damage it. Then, when the sun no longer risks damaging the satellite S1, the attitude control is once again modified so that the pointing of the satellite S1 reverts back to the normal pointing to the target geographic area ZG over which said service has to be rendered. The area ZE of the orbit over which the solar illumination can damage an item of satellite equipment is thus reduced.

The attitude control may comprise a temporary switchover to a continuous yaw angle piloting, so that the attitude of the satellite is modified continuously when the sun can damage it. This temporary yaw angle piloting mode is abandoned as soon as one of the two conditions cited previously is met.

Also, it is possible to improve the operational availability of a system of satellites in non-geostationary orbits by phase-shifting the shot-taking instants of two satellites S1, S2 that have the same geographic area ZG in view.

When the service rendered by the set of satellites is an imaging service for a geographic area ZG of the Earth, the means involved in the performance of said service installed on board the satellites S1 and S2 are activated with a temporal offset between said satellites, in relation to the shot-taking duration of a satellite.

For example, the shot-taking of a geographic area ZG by the second satellite S2 starts when the first satellite S1 has performed half the shot-taking of said geographic area ZG.

Thus, another criterion of operational availability of an observation service positioned on an inclined orbit with great eccentricity which consists in demanding the fastest possible temporal repetition of the images taken, is enhanced.

For example, a client may require an image of all of the target geographic area ZG every ten minutes, which directly dimensions the shot-taking instrument, generally with scanning, in the sense that all of the mechanism for scanning the target area and the consequential image data rate are constrained by this period of ten minutes.

Changing from ten minutes to five minutes makes it necessary to define a scanning mechanism that is twice as fast, associated image sensors that are twice as sensitive (because they are illuminated for only half the length of time), and the entire digital and radio transmission chain has to double its data rate.

By virtue of the temporal offset described previously separating the means involved in the performance of the service which are installed on board the satellites, it is thus possible, during a significant portion of the observation time, to double the observation rate without having to sustain the strong constraints described above.

Use is made of the fact that, for an observation service positioned on an inclined orbit with great eccentricity, there are often a number of satellites available, of which generally two are active around the moment of the handover of the imaging function. The fact that two satellites are available simultaneously potentially makes it possible to obtain twice the image of the target area.

It involves offsetting the imaging operations so that the start of image of the second satellite S2 occurs precisely at the mid point of the imaging cycle of the first satellite S1: for example, if the imaging cycle lasts ten minutes, the first satellite S1 starts the imaging of the target area at an instant t (and ends at t+10 nm), and the second satellite S2 starts its imaging at t+5 nm. The result is a rate of image every five minutes even though the two instruments are capable only of an image rate every ten minutes.

This doubled rate is not necessarily permanently available (unless the number of satellites is sufficiently great), but it remains very advantageous and, depending on the settings of the orbital parameters, can be extended over a not inconsiderable portion of the observation time even in the minimal case of two satellites S1 and S2.

It is also possible, furthermore, when the sun does not risk damaging the satellites, to control the satellites so that, at each instant, the service rendered for a geographic area is rendered by just one of said satellites.

Also, as a variant, the first satellite S1 can be relayed by a second satellite S2 when they are respectively in the positions P11 and P22 if the geographic area ZG that has to be covered by the service is divided into two sections Z1 and Z2 (which are therefore each smaller than the complete area ZG), the first Z1 being assigned to the first satellite S1 and the second being assigned to the second satellite S2.

The division into sections of the geographic area ZG has the characteristic that the first portion Z1 assigned to the first satellite S1 preferably consists of the element of the target area ZG which is located on the side where the first satellite S1 is directed (the portion of the surface area that is "closest" to the first satellite S1).

The other portion Z2 constitutes the complement of the first portion Z1 in the target area ZG, and the laws of orbital mechanics dictate that this second section Z2 is, symmetrically, better situated to be observed by the second satellite S2.

As explained previously, a progressive switchover is performed, i.e. the areas Z1 and Z2 change continuously over time.

It is thus possible, around the critical moment of the change of satellite rendering the service, for example the observation service, to alleviate the constraint of visibility of the target area ZG by allowing, for each satellite, a target area that is temporarily smaller (i.e. the section Z1 or Z2) at the precise moment when the observation becomes difficult because the satellites are no longer ideally placed: the first is getting ready to leave the portion of orbit over which it was seeing the target area, the second is just beginning to enter therein, not yet being in sight of the entire area ZG. Also, without interrupting continuity of service, the two successive satellites S1 and S2 may be further apart from one another, which means that, for example, the total number of satellites necessary for continuity of observation can be reduced, or else, alternatively, it is possible to choose orbits on which the conditions of observation of the target area ZG are more reduced, which, by a conventional method, would not therefore allow for a continuity of service, whereas, by proceeding as described above, the continuity of service is possible over the target area ZG.

The satellites S1 and S2, which previously had to follow one another so as to be respectively at P1 and P2, can now be moved further apart until they are located respectively at P11 and P22.

The sections Z1 and Z2 can furthermore change over time during this handover of the imaging function from one satellite S1 to the next S2.

As for a constellation of satellites involving more than two satellites, it is possible to define, in a similar manner, a division of the target area ZG into three or more sections, associated with as many satellites entering into visibility or on the point of leaving the visibility of the target area ZG.

The result of this method is that it extends the "useful" portion of the orbit, allowing for a start of service by a satellite, such as the taking of a shot, earlier than if it was necessary to wait to have complete visibility of the target area ZG and, symmetrically, an end of service by a satellite later on the orbit: therefore, in all, a better coverage of the target area ZG.

Thus, the coverage is increased for a given orbit, but, in the mission definition phase, it can, conversely, be used to "relax" the orbit, in other words, it is possible to use orbit categories which previously would not have been appropriate. Thus, it is possible to use orbits of lower inclination, that are therefore easier to reach by a launch vehicle, also allowing for a saving on satellite launch costs.

The invention claimed is:

1. A method for controlling a set of at least two satellites designed to provide a service on a geostationary orbit and to render said service on a non-geostationary orbit, the method comprising:
    deactivating components configured to be involved in performance of said service, the components being installed on board a satellite of the set, when the sun is in a position relative to the satellite to damage said satellite; and
    activating other components configured to be involved in the performance of said service, the other components installed on board another satellite of the set, to continue performance of the service.

2. The method according to claim 1, wherein an attitude of the satellite is controlled based on an instantaneous position of the sun, the method further comprising temporarily modifying the attitude of the satellite when the sun is in the position relative to the satellite to damage the satellite.

3. The method according to claim 2, wherein temporarily modifying the attitude of the satellite comprises continuous yaw angle piloting of the satellite, such that:

the attitude of the satellite is modified continuously when the sun is in the position relative to the satellite to damage said satellite, and the satellite reverts to pointing to a target geographic area over which said service is rendered when the sun is not in a position relative to the satellite to damage said satellite.

4. The method according to claim 1, wherein said service rendered by the set of at least two satellites is imaging of the geographic area of the Earth, and the components configured to be involved in the performance of said service installed on board the other satellite of the set are activated with a temporal offset between said at least two satellites, relative to an imaging duration of a satellite.

5. The method according to claim 4, wherein the set comprises two satellites, and wherein one of the two satellites starts imaging of a geographic area following completion of half of the imaging of said geographic area by another of the two satellites.

6. The method according to claim 1, wherein, when the sun is not in a position relative to the satellite to damage said satellite, said satellite is controlled such that, at each instant, the service performed for a geographic area is performed by only one of said at least two satellites.

7. A satellite system comprising a set of at least two satellites designed to provide a service on a geostationary orbit and to render said service on a non-geostationary orbit, the satellite system being configured to:

deactivate components configured to be involved in performance of said service, the components being installed on board a satellite of the set, when the sun is in a position relative to the satellite to damage said satellite; and activate other components configured to be involved in the performance of said service, the other components installed on board another satellite of the set, to continue performance of the service.

* * * * *